(12) United States Patent
Fletcher

(10) Patent No.: US 10,374,646 B1
(45) Date of Patent: Aug. 6, 2019

(54) CROWD SIZE ESTIMATION BASED ON WIRELESS SIGNAL ABSORPTION

(71) Applicant: Cubic Corporation, San Diego, CA (US)

(72) Inventor: Graham Fletcher, Swindon (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/225,239

(22) Filed: Dec. 19, 2018

Related U.S. Application Data

(60) Provisional application No. 62/627,499, filed on Feb. 7, 2018.

(51) Int. Cl.
  *H04B 1/10* (2006.01)
  *H04B 17/20* (2015.01)
  *H04B 1/16* (2006.01)

(52) U.S. Cl.
  CPC ......... *H04B 1/1018* (2013.01); *H04B 1/1027* (2013.01); *H04B 1/16* (2013.01); *H04B 17/20* (2015.01)

(58) Field of Classification Search
  CPC .......... H04B 1/10; H04B 1/1036; H04B 1/06; H04B 1/1018; H04B 15/00; H04B 2201/709718; H04B 1/1027; H04B 17/20; H04L 27/2647; H04J 11/0066
  See application file for complete search history.

(56) References Cited

U.S. PATENT DOCUMENTS

| | | | |
|---|---|---|---|
| 6,449,461 B1 * | 9/2002 | Otten | H01Q 1/243 |
| 8,023,397 B2 * | 9/2011 | Awater et al. | H04L 27/2626 375/219 |
| 2007/0036208 A1 * | 2/2007 | Olgaard | H04B 7/15535 |
| 2012/0236970 A1 * | 9/2012 | Schlegel et al. | H04B 15/04 |
| 2015/0261280 A1 * | 9/2015 | Hsiao et al. | H03M 1/0629 |
| 2016/0124071 A1 | 5/2016 | Baxley et al. | |

(Continued)

OTHER PUBLICATIONS

International Search Report and Written Opinion dated Apr. 1, 2019 in International Patent Application No. PCT/US2019/012470, all pages.

(Continued)

*Primary Examiner* — Khanh C Tran
(74) *Attorney, Agent, or Firm* — Kilpatrick Townsend & Stockton

(57) ABSTRACT

Methods and devices for detecting wireless signal absorption using power sensing circuitry. One method includes receiving, by a receiving device having power sensing circuitry, a plurality of wireless signals from a plurality of transmitting devices. The power sensing circuitry may include a local oscillator, a mixer, and a band-pass filter. The method may also include detecting, by the power sensing circuitry, a plurality of power levels for the plurality of wireless signals, where each power level of the plurality of power levels corresponds one of the plurality of wireless signals. The method may further include analyzing, by one or more processors, the plurality of power levels to determine three characteristic power levels of the plurality of power levels. The method may further include calculating, by the one or more processors, an absorption amount based on the three characteristic power levels.

17 Claims, 15 Drawing Sheets

(56) References Cited

U.S. PATENT DOCUMENTS

2016/0126988 A1* 5/2016 Mester .................... H04B 1/10
375/350
2017/0374618 A1* 12/2017 Ramjee et al. ...... G01R 23/165

OTHER PUBLICATIONS

Di Domenico Simone, et al.: "Trained-Once Device-Free Crowd Counting and Occupancy Estimation Using WiFi: A Doppler Spectrum Based Approach" 2016 IEEE 12$^{th}$ International Conference on Wireless and Mobile Computing, Networking and Communications (WiMob), Oct. 17, 2016, XP033015456, DOI: 10.1109/WIMOB.2016.7763227, 8 pages.
Masaya Arai, et al.: "Estimation of ZigBee's RSSI Fluctuated by Crowd Behavior in Indoor Space", SICE Annual Conference 2010, Proceedings of, IEEE, Piscataway, NJ, USA, Aug. 18, 2010 XP031775435, ISBN: 978-1-4244-7642-8, 6 pages.
Aguilera Unai, et al.: "A Platform for Overcrowding Detection in Indoor Events Using Scalable Technologies", 2016 Intl. IEEE Conferences on Ubiquitous Intelligence & Computing, Advanced an Trusted Computing, Scalable Computing and Communications, Cloud and Big Data Computing, Internet of People, and Smart World Congress, XP033043082, DOI: 10.1109/UIC-ATC-SCALCOM-CBDCOM-IOP-Smartworld.2016.0058, Jul. 18, 2016, 8 pages.
Di Domenico Simone, et al.: "LTE-based passive Device-Free Crowd Density Estimation" 2017 IEEE International Conference on Communications (ICC), IEEE, XP033133015; DOI: 10.1109/ICC.2017.7997194, May 21, 2017, 6 pages.

* cited by examiner

CROWD SIZE ESTIMATION BASED ON WIRELESS SIGNAL ABSORPTION

CROSS-REFERENCES TO RELATED APPLICATIONS

This Application claims priority to U.S. Provisional Patent Application No. 62/627,499 filed Feb. 7, 2018 titled "PEOPLE COUNTING USING WIRELESS RADIO FREQUENCY SIGNAL ABSORPTION," the entire disclosure of which is hereby incorporated by reference, for all purposes, as if fully set forth herein.

BACKGROUND OF THE INVENTION

A propagating wireless signal can be affected by different materials in different ways prior to arriving at a destination such as a receiving device. For example, different materials may cause the wireless signal to be reflected, scattered, diffracted, and/or absorbed, among other possibilities. Wireless signal absorption is generally characterized by a reduction in the signal power as a portion thereof is converted into heat within the material causing the absorption. The detection of such wireless signal absorption is useful in several applications. In some instances, a material may be characterized based on its frequency-dependent absorption properties. For example, a transmitter positioned near the material may vary the frequency of a transmitted signal over a range of interrogation frequencies, and a receiver positioned on the other side of the material may detect the frequency response.

Using wireless signal absorption to estimate the number of people surrounding or near a receiving device is problematic for a number of reasons. First, methods may generally require knowledge of the transmitting signal power and/or the position of the transmitter, thereby requiring a system-controlled transmitter at a fixed position. Second, counting a number of people based on a number of wireless signals can be highly inaccurate, where the proportion of the crowd with devices that emit signals can vary drastically, depending on the demographics of the crowd. This may also require some identification of the signal sources (to ensure they are uniquely identified), which may require decoding signal data (e.g., to determine an identifier). Accordingly, new systems, methods, and other techniques are needed.

BRIEF SUMMARY OF THE INVENTION

A summary of the invention is described in reference to one or more examples listed below. As used below, any reference to a series of examples is to be understood as a reference to each of those examples disjunctively (e.g., "Examples 1-4" is to be understood as "Examples 1, 2, 3, or 4").

Example 1 is a method of detecting wireless signal absorption using power sensing circuitry, the method comprising: receiving, by a receiving device having power sensing circuitry, a plurality of wireless signals from a plurality of transmitting devices, the power sensing circuitry comprising: a local oscillator configured to generate a sinusoidal signal; a mixer configured to mix the sinusoidal signal with the plurality of wireless signals to generate a plurality of mixed signals; and a band-pass filter configured to filter the plurality of mixed signals; detecting, by the power sensing circuitry, a plurality of power levels for the plurality of wireless signals, wherein each power level of the plurality of power levels corresponds one of the plurality of wireless signals; sending the plurality of power levels from the power sensing circuitry to one or more processors; analyzing, by the one or more processors, the plurality of power levels to determine three characteristic power levels of the plurality of power levels; and calculating, by the one or more processors, an absorption amount based on the three characteristic power levels.

Example 2 is the method of example(s) 1, further comprising: estimating a number of people surrounding the receiving device based at least in part on the absorption amount.

Example 3 is the method of example(s) 1-2, wherein a first characteristic power level of the three characteristic power levels is a maximum power level of the plurality of power levels.

Example 4 is the method of example(s) 1-3, wherein: a second characteristic power level of the three characteristic power levels is a ⅔ percentile power level of the plurality of power levels; and a third characteristic power level of the three characteristic power levels is a ⅓ percentile power level of the plurality of power levels.

Example 5 is the method of example(s) 1-4, wherein calculating the absorption amount based on the three characteristic power levels includes: calculating a first difference between the first characteristic power level and the third characteristic power level; calculating a second difference between the first characteristic power level and the second characteristic power level; and calculating a ratio between the first difference and the second difference, wherein the absorption amount is calculated based on the ratio.

Example 6 is the method of example(s) 1-5, wherein the one or more processors are located within the receiving device.

Example 7 is the method of example(s) 1-6, wherein the one or more processors are located remote to the receiving device.

Example 8 is a receiving device for detecting wireless signal absorption, the receiving device comprising: an antenna for receiving a plurality of wireless signals from a plurality of transmitting devices; power sensing circuitry for detecting a plurality of power levels for the plurality of wireless signals, wherein each power level of the plurality of power levels corresponds one of the plurality of wireless signals, and wherein the power sensing circuitry comprises: a local oscillator configured to generate a sinusoidal signal; a mixer configured to mix the sinusoidal signal with the plurality of wireless signals to generate a plurality of mixed signals; and a band-pass filter configured to filter the plurality of mixed signals; and one or more processors configured to perform operations including: receiving the plurality of power levels from the power sensing circuitry; analyzing the plurality of power levels to determine three characteristic power levels of the plurality of power levels; and calculating an absorption amount based on the three characteristic power levels.

Example 9 is the receiving device of example(s) 8, wherein the operations further comprise: estimating a number of people surrounding the receiving device based at least in part on the absorption amount.

Example 10 is the receiving device of example(s) 8-9, wherein a first characteristic power level of the three characteristic power levels is a maximum power level of the plurality of power levels.

Example 11 is the receiving device of example(s) 8-10, wherein: a second characteristic power level of the three characteristic power levels is a ⅔ percentile power level of the plurality of power levels; and a third characteristic power level of the three characteristic power levels is a ⅓ percentile power level of the plurality of power levels.

Example 12 is the receiving device of example(s) 8-11, wherein calculating the absorption amount based on the three characteristic power levels includes: calculating a first difference between the first characteristic power level and the third characteristic power level; calculating a second difference between the first characteristic power level and the second characteristic power level; and calculating a ratio between the first difference and the second difference, wherein the absorption amount is calculated based on the ratio.

Example 13 is the receiving device of example(s) 8-12, wherein the plurality of power levels are received from the power sensing circuitry via a wireless connection.

Example 14 is a non-transitory computer-readable medium comprising instructions that, when executed by one or more processors, cause the one or more processors to perform operations including: receiving, by a receiving device having power sensing circuitry, a plurality of wireless signals from a plurality of transmitting devices, the power sensing circuitry comprising: a local oscillator configured to generate a sinusoidal signal; a mixer configured to mix the sinusoidal signal with the plurality of wireless signals to generate a plurality of mixed signals; and a band-pass filter configured to filter the plurality of mixed signals; detecting, by the power sensing circuitry, a plurality of power levels for the plurality of wireless signals, wherein each power level of the plurality of power levels corresponds one of the plurality of wireless signals; analyzing, by the one or more processors, the plurality of power levels to determine three characteristic power levels of the plurality of power levels; and calculating, by the one or more processors, an absorption amount based on the three characteristic power levels.

Example 15 is the non-transitory computer-readable medium of example(s) 14, wherein the operations further comprise: estimating a number of people surrounding the receiving device based at least in part on the absorption amount.

Example 16 is the non-transitory computer-readable medium of example(s) 14-15, wherein a first characteristic power level of the three characteristic power levels is a maximum power level of the plurality of power levels.

Example 17 is the non-transitory computer-readable medium of example(s) 14-16, wherein: a second characteristic power level of the three characteristic power levels is a ⅔ percentile power level of the plurality of power levels; and a third characteristic power level of the three characteristic power levels is a ⅓ percentile power level of the plurality of power levels.

Example 18 is the non-transitory computer-readable medium of example(s) 14-17, wherein calculating the absorption amount based on the three characteristic power levels includes: calculating a first difference between the first characteristic power level and the third characteristic power level; calculating a second difference between the first characteristic power level and the second characteristic power level; and calculating a ratio between the first difference and the second difference, wherein the absorption amount is calculated based on the ratio.

Example 19 is the non-transitory computer-readable medium of example(s) 14-18, wherein the one or more processors are located within the receiving device.

Example 20 is the non-transitory computer-readable medium of example(s) 14-19, wherein the one or more processors are located remote to the receiving device.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
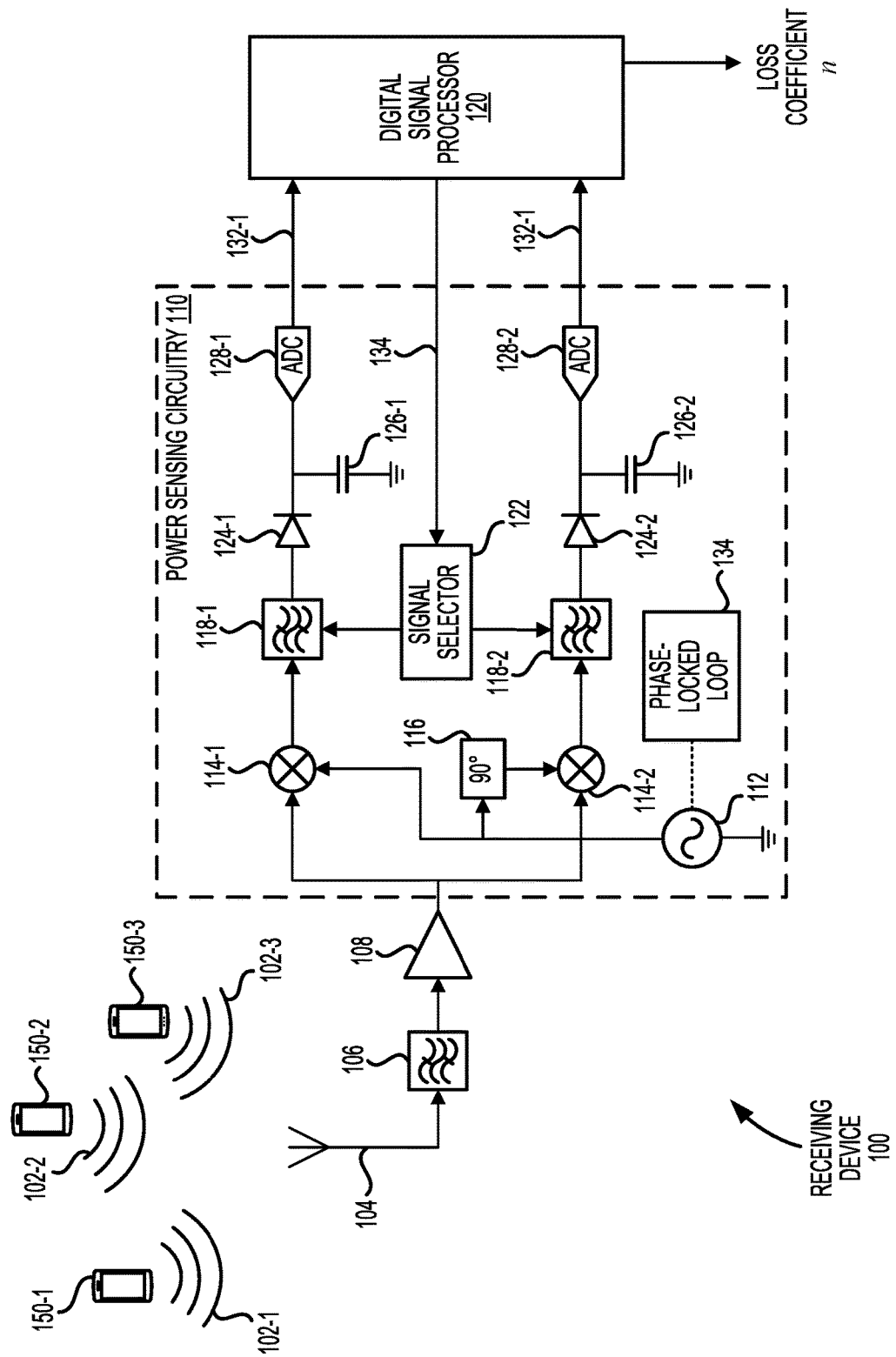
FIG. 1 illustrates a schematic diagram of a receiving device having power sensing circuitry, according to some embodiments of the present invention.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the invention described herein are generally related to system, methods, and other techniques for estimating the number of people in a crowd using wireless signals. Some embodiments provided herein may employ BLUETOOTH™ technology to count crowds of people in transit applications. It will be understood, however, that alternative wireless technologies may be used, and that the techniques provided herein may be utilized in applications beyond transit.

Embodiments provided herein address these and other issues by utilizing radio-frequency (RF) signals, such as BLUETOOTH™ signals, to count crowd sizes by determining a loss coefficient of these signals in a given area and calculating the crowd based on the determined loss, coefficient. This technique can leverage the fact that wireless signals at certain frequencies are absorbed by human bodies due to water content, and thus, by measuring the strength of all signals being received, it is possible to calculate the loss coefficient of the medium through which the signals are traveling. This loss coefficient directly links to the crowd density and therefore, the number of people in the crowd. The sources of these RF signals may be native to the crowd (e.g., cell phones and/or other devices carried by people in the crowd) and/or may include external sources (e.g. RF beacons, routers, and/or other transmitters in the area).

Counting crowds utilizing these techniques are advantageous over traditional methods for a variety of reasons. For instance, no content of the signal is necessary, only the signal strength is needed. This means that the signal does not need to be decoded and encrypted signals can be used (regardless of any changes that occur in standards that govern the way in which information is encoded and/or encrypted). It also means that repeated signals from the same device do not affect the calculation (as it would using the traditional technique of counting a number of signal sources in a crowd). By extension, this means there are no privacy issues and no data protection issues. Moreover, there is no need to know how many signal sources there are in a given area. It is their relative numbers at different signal strengths that drive the determination. Techniques herein work virtually independent of the number of sources, working, for example, whether 5% of the people in a crowd have signal sources (e.g., mobile phones) or 50% of the people do. Thus, there is no requirement for knowledge about the demographics of the crowd.

The present disclosure describes a theoretical approach to calculate a path loss coefficient from signal counts and power levels. Experimental results demonstrated that there is a reasonable correlation between the calculated loss coefficient and the number of people surrounding a receiving device, indicating that this calculation can form the basis of a viable passenger counting technology. In one experimental result in which two averaged receiving devices were used, an accuracy of approximately 15% was obtained. As the approach does not require any information contained in the wireless signal, hardware can be developed that does not access the digital content, reducing cost and increasing passenger privacy. The approach would also be immune to cryptographic interventions in various wireless standards in the future.

FIG. 1 illustrates a schematic diagram of a receiving device 100 having power sensing circuitry 110, according to some embodiments of the present invention. Receiving device 100 may receive a plurality of wireless signals 102 transmitted by a plurality of transmitting devices 150 surrounding receiving device 100. Transmitting devices 150 may include any stationary or portable device capable of transmitting an RF wireless signal, such as a mobile phone. One or more of transmitting devices 150 may be carried by a user or may be fixed to a surface or object.

Receiving device 100 may receive wireless signals 102 via an antenna 104. Antenna 104 may be linearly or circularly polarized, may be mounted or embedded, may be a single antenna or an array antenna, may have a narrow or wide bandwidth, among other possibilities. Receiving device 100 may include a band-pass filter 106 for initially filtering out undesirable frequency components outside the frequencies of interest. In one example, band-pass filter 106 has a passband extending from 2.4 GHz to 2.5 GHz. After passing through band-pass filter 106, the received signals are amplified by a low-noise amplifier (LNA) 108 and are fed into power sensing circuitry 110.

Power sensing circuitry 110 may include a local oscillator 112 for generating a sinusoidal signal having a phase controlled by a phase-locked loop 134. The sinusoidal signal may be fed into a phase shifter 116 so that two different sinusoidal signals that are 90 degrees out of phase with each other may be produced. Power sensing circuitry 110 may include two mixers 114 for mixing the sinusoidal signals with received wireless signals 102 to generate two mixed signals. Mixers 114 may cause the received signals to down convert from RF to intermediate frequencies (IF). Power sensing circuitry 110 may include two band-pass filters 118 for removing frequency components of the mixed signals outside IF.

Optionally, power sensing circuitry 110 may include two peak detection circuits formed by diodes 124 and capacitors 126. After passing through the peak detection circuits, the mixed signals may be sampled by two A/D converters 128 to generate a plurality of power levels 132. In various embodiments, power levels 132 may be digital (e.g., discrete and/or binary) signals or analog signals. Power levels 132 may be fed into a digital signal processor 120 via a wired and/or wireless connection. In some embodiments, digital signal processor 120 may send a control signal 134 to a signal selector 122 for adjusting band-pass filters 118. For example, in some embodiments band-pass filters 118 may have passbands allowing originally transmitted signals having frequencies between 2.411 GHz and 2.412 GHz to pass through during a first time interval and passbands allowing originally transmitted signals having frequencies between 2.436 GHz and 2.437 GHz to pass through during a second time interval after the first time interval. In various embodiments, band-pass filter 118-1 may have a same or a different passband than band-pass filter 118-2. In this manner, digital signal processor 120 may receive power levels 132 associated with different wireless signals 102 transmitted by different transmitting devices 150 and calculate a loss coefficient n based on power levels 132.

In some instances, receiving device 100 includes additional or fewer components than that shown in FIG. 1. For example, receiving device 100 may include a single mixer 114, a single band-pass filter 118, a single diode 124, a single capacitor 126, and a single A/D converter 128. In some embodiments, receiving device 100 does not include band-pass filter 106 and LNA 108. In some embodiments, A/D converter 128 is coupled directly to antenna 104 and samples the RF signal directly without down-conversion to IF. In some embodiments, receiving device 100 only includes band-pass filters 118 and A/D converters 128. Other possible configurations of receiving device 100 and power sensing circuitry 110 are contemplated.

Figure 2:
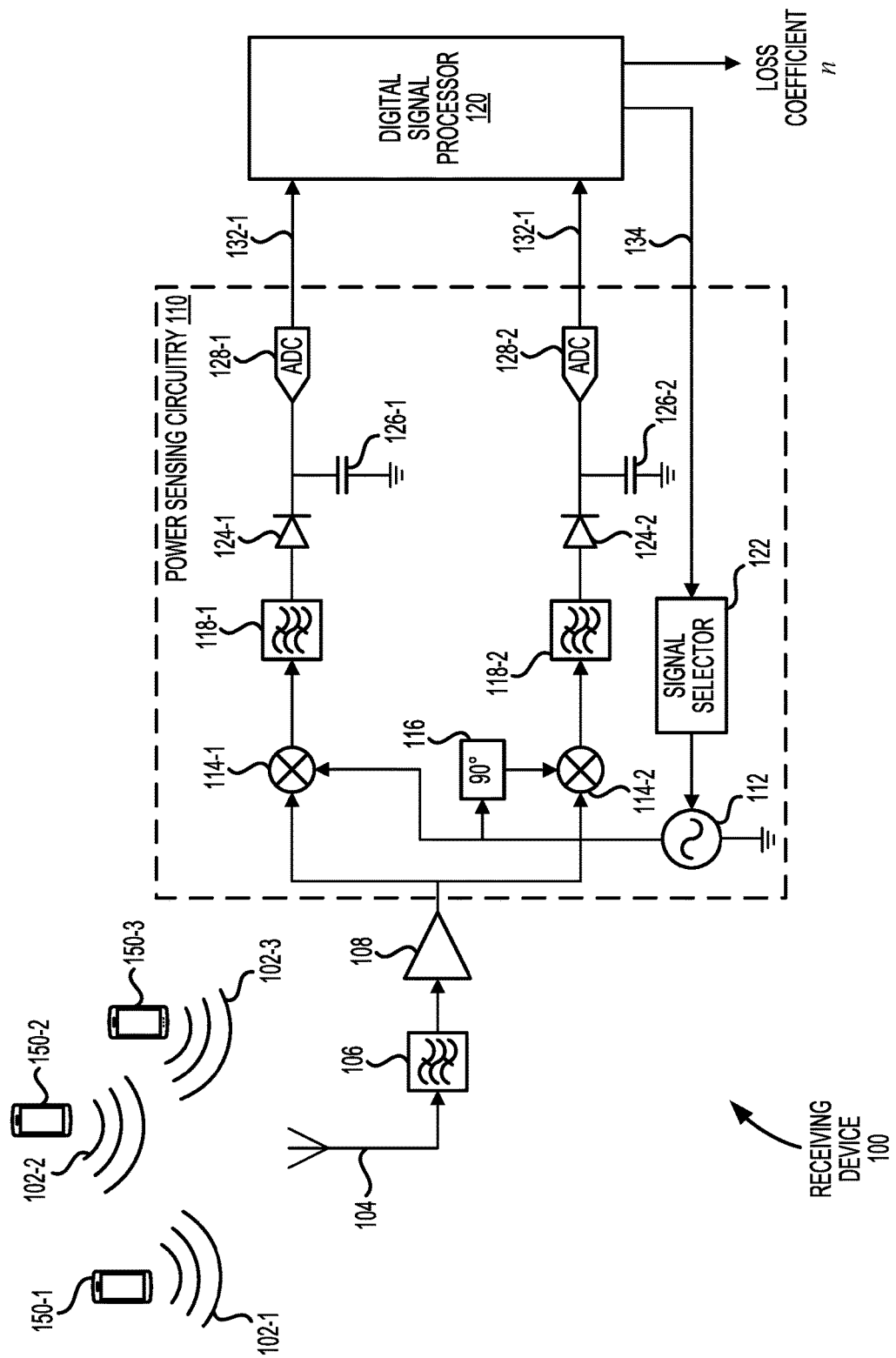
FIG. 2 illustrates a schematic diagram of a receiving device, according to some embodiments of the present invention.

FIG. 2 illustrates a schematic diagram of an alternative configuration of receiving device 100, according to some embodiments of the present invention. Receiving device 100 may receive a plurality of wireless signals 102 transmitted by a plurality of transmitting devices 150 surrounding receiving device 100, filter out undesirable frequency components using band-pass filter 106, amplify the received signals using LNA 108, and mix the received signals with sinusoidal signals generated by local oscillator 112 to generate two mixed signals. Signal selector 122 may control the frequency of the sinusoidal signal generated by local oscillator 112 so that the received signals at a desired frequency are down converted to the passbands of band-pass filters 118.

Similar to FIG. 1, power sensing circuitry 110 may include two peak detection circuits formed by diodes 124 and capacitors 126. After passing through the peak detection circuits, the mixed signals may be sampled by two A/D converters 128 to generate a plurality of power levels 132 that are fed into digital signal processor 120 via a wired and/or wireless connection. Digital signal processor 120 may send control signal 134 to signal selector 122 for adjusting the frequency of the generated sinusoidal signal such that the received signals at a desired frequency are down converted to IF. In this manner, digital signal processor 120 may receive power levels 132 associated with different wireless signals 102 transmitted by different transmitting devices 150 and calculate loss coefficient n based on power levels 132.

Figure 3:
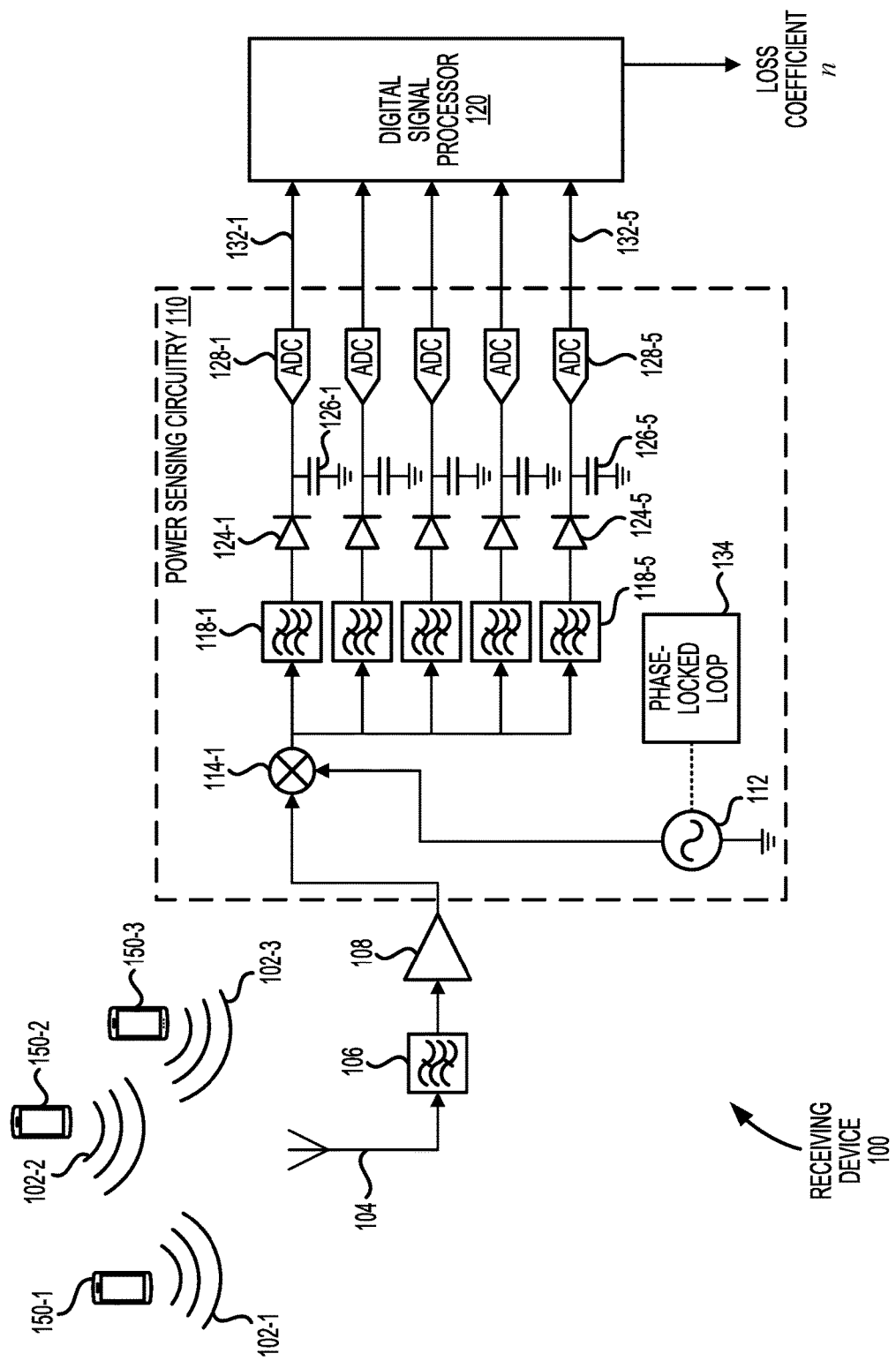
FIG. 3 illustrates a schematic diagram of a receiving device, according to some embodiments of the present invention.

FIG. 3 illustrates a schematic diagram of an alternative configuration of receiving device 100, according to some embodiments of the present invention. Receiving device 100 may receive a plurality of wireless signals 102 transmitted by a plurality of transmitting devices 150 surrounding receiving device 100, filter out undesirable frequency components using band-pass filter 106, amplify the received signals using LNA 108, and mix the received signals with the sinusoidal signal generated by local oscillator 112 to generate one or more mixed signals. Power sensing circuitry 110 may include a plurality of band-pass filters 118 for dividing the mixed signal into different frequency bands. For example, the five passbands of the five band-pass filters 118 may be set so as to allow originally transmitted signals having frequencies between 2.411 GHz and 2.412 GHz, 2.412 GHz and 2.413 GHz, 2.413 GHz and 2.414 GHz, 2.414 GHz and 2.415 GHz, and 2.415 GHz and 2.416 GHz to pass through band-pass filters 118-1, 118-2, 118-3, 118-4, and 118-5, respectively.

Similar to FIG. 1, power sensing circuitry 110 may include peak detection circuits formed by diodes 124 and capacitors 126. After passing through the peak detection circuits, the mixed signals may be sampled by A/D converters 128 to generate a plurality of power levels 132 that are fed into digital signal processor 120 via a wired and/or wireless connection. In this manner, digital signal processor 120 may receive power levels 132 associated with different wireless signals 102 transmitted by different transmitting devices 150 and calculate loss coefficient n based on power levels 132.

Figure 4:
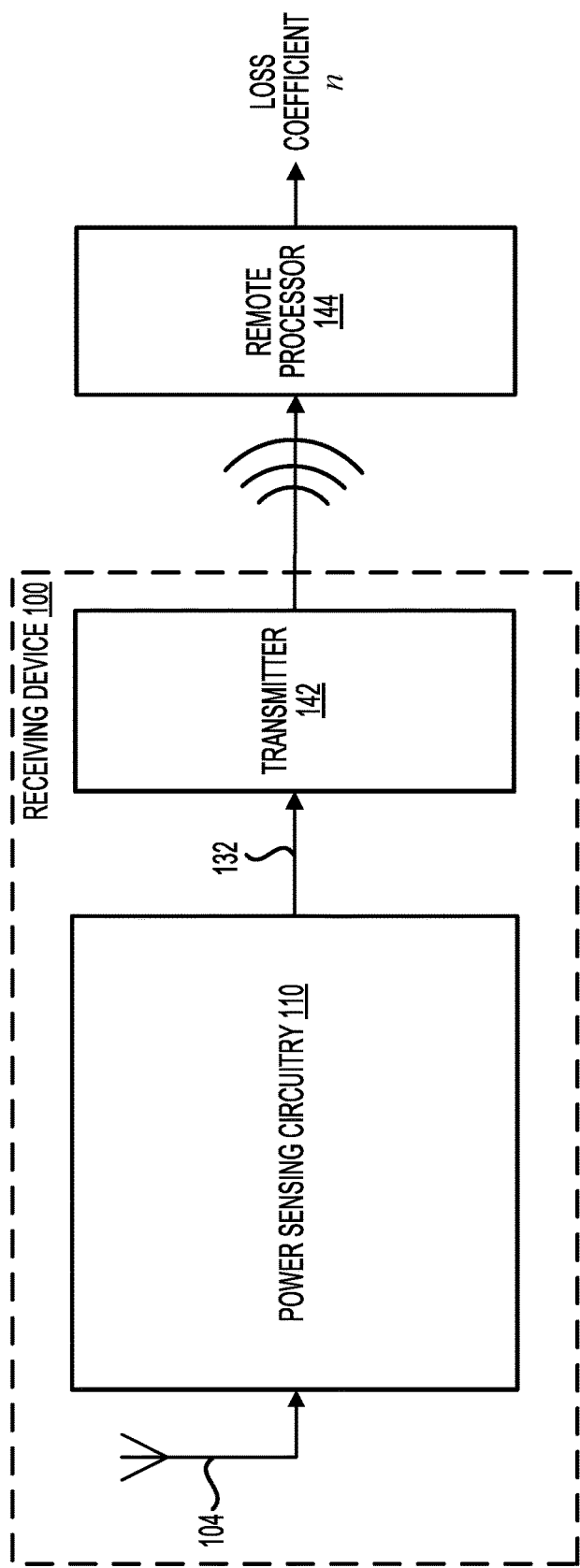
FIG. 4 illustrates a schematic diagram of a receiving device in communication with a remote processor, according to some embodiments of the present invention.

FIG. 4 illustrates a schematic diagram of an alternative configuration of receiving device 100 in communication with a remote processor 144, according to some embodiments of the present invention. Receiving device 100 may include antenna 104, power sensing circuitry 110, and a transmitter 142 for transmitting power levels 132 wirelessly to remote processor 144, which may be configured to calculate loss coefficient n based on power levels 132. Remote processor 144 may have similar functionality to digital signal processor 120.

Figure 5:
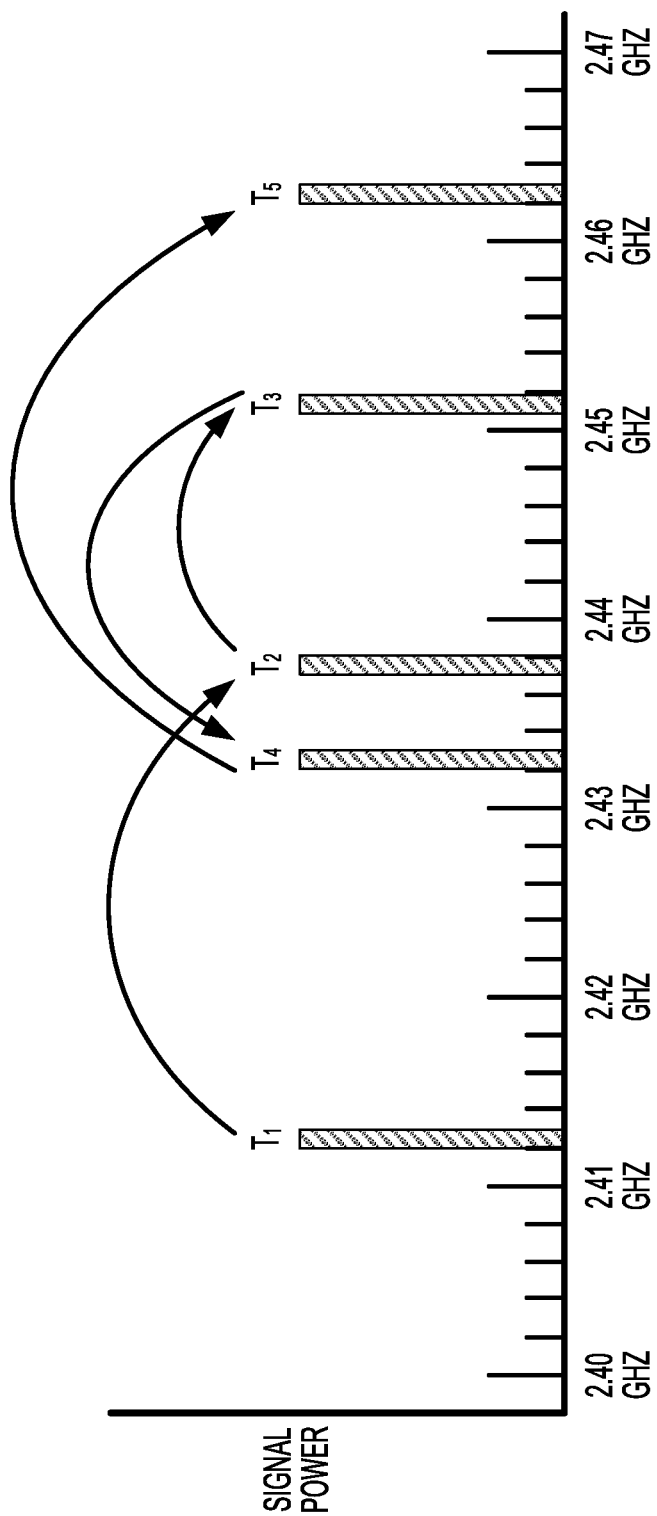
FIG. 5 illustrates a diagram showing detected signal power as a function of frequency as received by a receiving device, according to some embodiments of the present invention.

FIG. 5 illustrates a diagram showing detected signal power as a function of frequency as received by receiving device 100, according to some embodiments of the present invention. The diagram shown in FIG. 5 may correspond to power levels 132 associated with one of wireless signals 102 as a function of time as received by digital signal processor 120. In some embodiments, transmitting devices 150 may employ frequency hoping to reduce the effects of interference with other devices. The hop sequence may be unique for each transmitting device 150 and each hop may occur at a predetermined frequency, which may be much lower than the carrier frequency of wireless signals 102. At time $T_1$, the signal power may be concentrated around 2.412 GHz, and may move to 2.437 GHz at time $T_2$, to 2.451 GHz at time $T_3$, to 2.432 GHz at time $T_4$, and to 2.462 GHz at time $T_5$.

Figure 6:
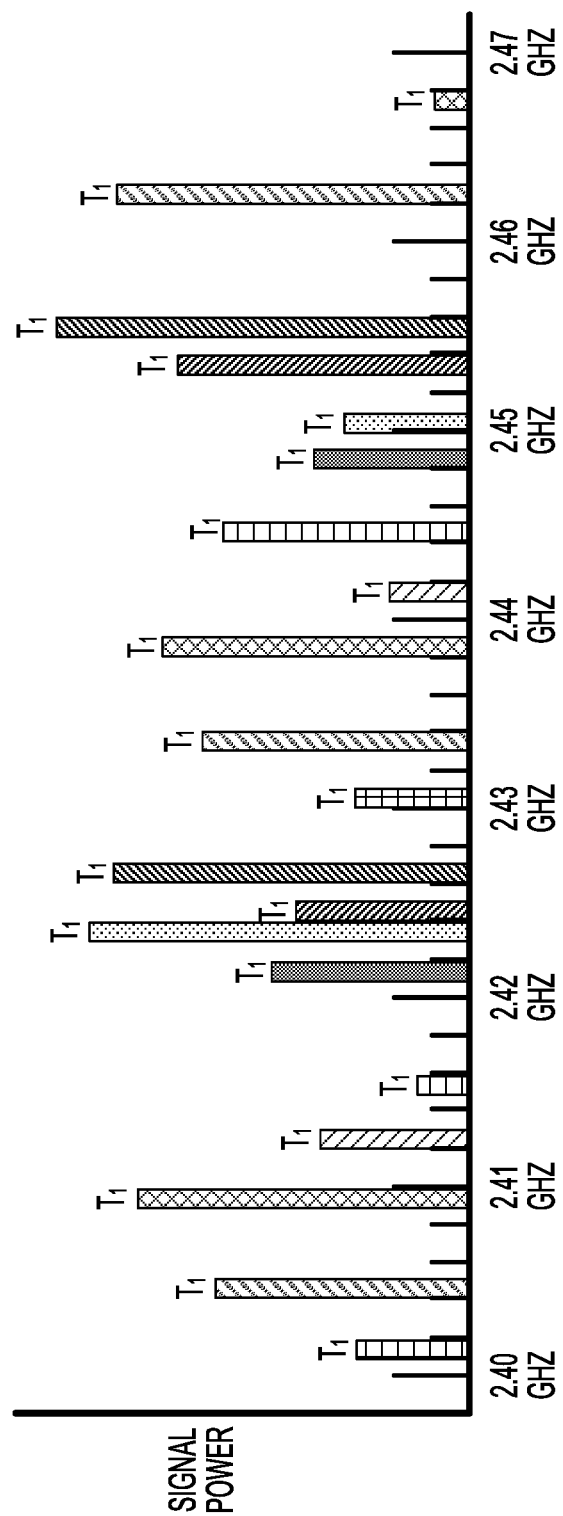
FIG. 6 illustrates a diagram showing detected signal power as a function of frequency as received by a receiving device, according to some embodiments of the present invention.

FIG. 6 illustrates a diagram showing detected signal power as a function of frequency as received by receiving device 100, according to some embodiments of the present invention. The diagram shown in FIG. 6 may correspond to power levels 132 associated with multiple wireless signals 102 during a single time interval as received by digital signal processor 120. At time $T_1$, signal powers are detected at multiple frequencies between 2.40 GHz and 2.47 GHz. The signal powers may be detected concurrently, simultaneously, or sequentially by receiving device 100.

Figure 7:
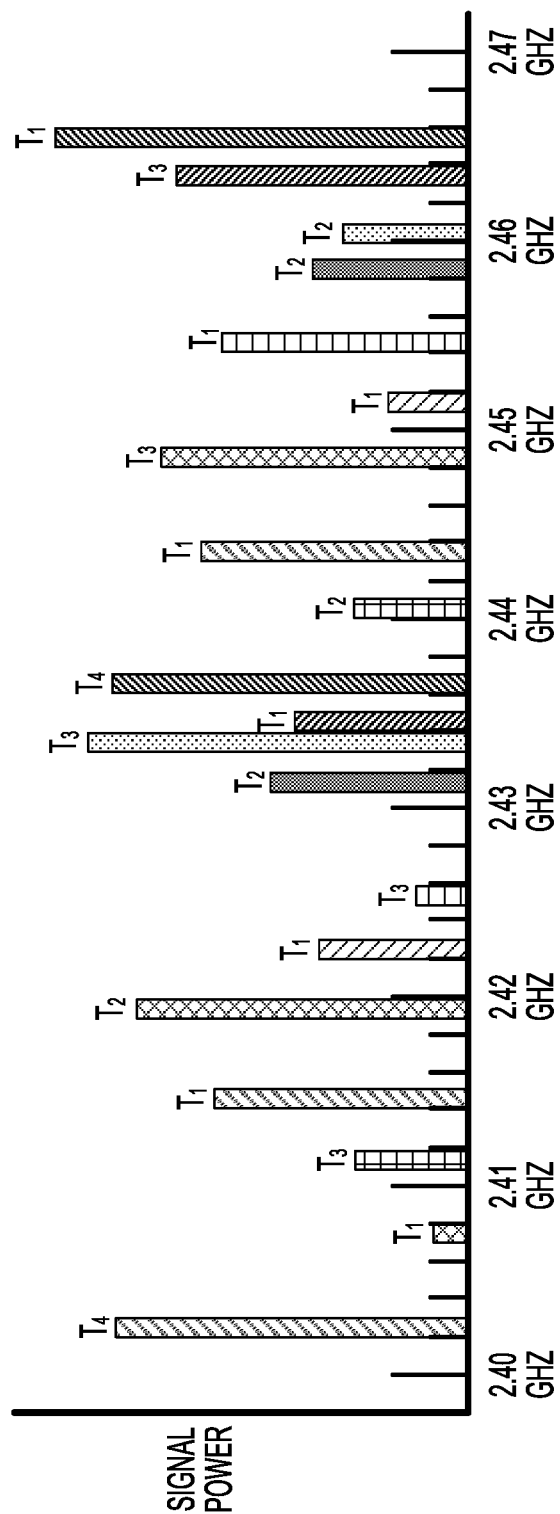
FIG. 7 illustrates a diagram showing detected signal power as a function of frequency as received by a receiving device, according to some embodiments of the present invention.

FIG. 7 illustrates a diagram showing detected signal power as a function of frequency as received by receiving device 100, according to some embodiments of the present invention. The diagram shown in FIG. 7 may correspond to power levels 132 associated with multiple wireless signals 102 during multiple time intervals as received by digital signal processor 120. At each of times $T_1$, $T_2$, $T_3$, and $T_4$, signal powers are detected at multiple frequencies between 2.40 GHz and 2.47 GHz. One or more of the signal powers may be detected concurrently, simultaneously, or sequentially by receiving device 100.

Figure 8:
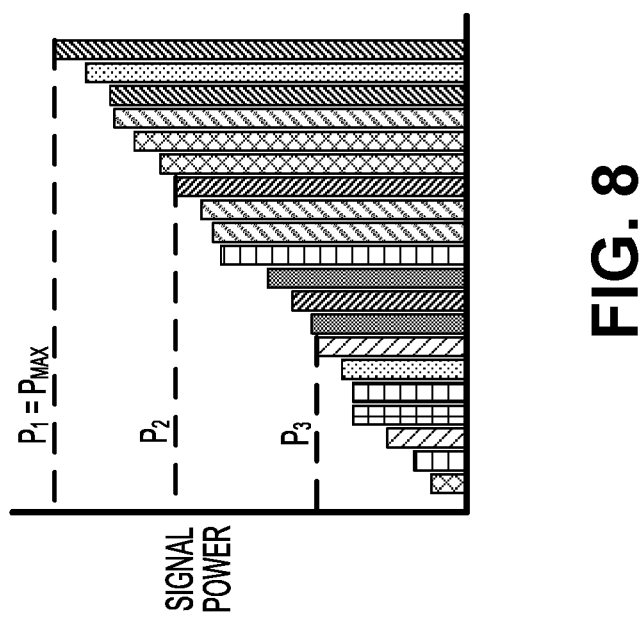
FIG. 8 illustrates a diagram showing detected signal power as received by a receiving device, according to some embodiments of the present invention.

FIG. 8 illustrates a diagram showing detected signal power as received by receiving device 100, according to some embodiments of the present invention. In the illustrated diagram, the detected signal powers from either of the diagrams of FIG. 6 or 7 are sorted by signal power (i.e., power level) in ascending order by, for example, digital signal processor 120. Next, the power levels may be analyzed to determine three characteristic power levels, $P_1$, $P_2$, and $P_3$. In some embodiments, a first characteristic power level $P_1$ is determined to be a maximum power level of the power levels, a second characteristic power level $P_2$ is determined to be a ⅔ (i.e., 66.7%) percentile power level of the power levels, and a third characteristic power level $P_3$ is determined to be a ⅓ (i.e., 33.3%) percentile power level of the power levels. In some embodiments, the second characteristic power level $P_2$ is set equal to one of the power levels near the ⅔ percentile (e.g., to the power level directly above, below, or at the ⅔ percentile), to a midpoint or an average between two or more of the power levels near the ⅔ percentile, among other possibilities. In some embodiments, the third characteristic power level $P_3$ is set equal to one of the power levels near the ⅓ percentile (e.g., to the power level directly above, below, or at the ⅓ percentile), to a midpoint or an average between two or more of the power levels near the ⅓ percentile, among other possibilities.

Figure 9:
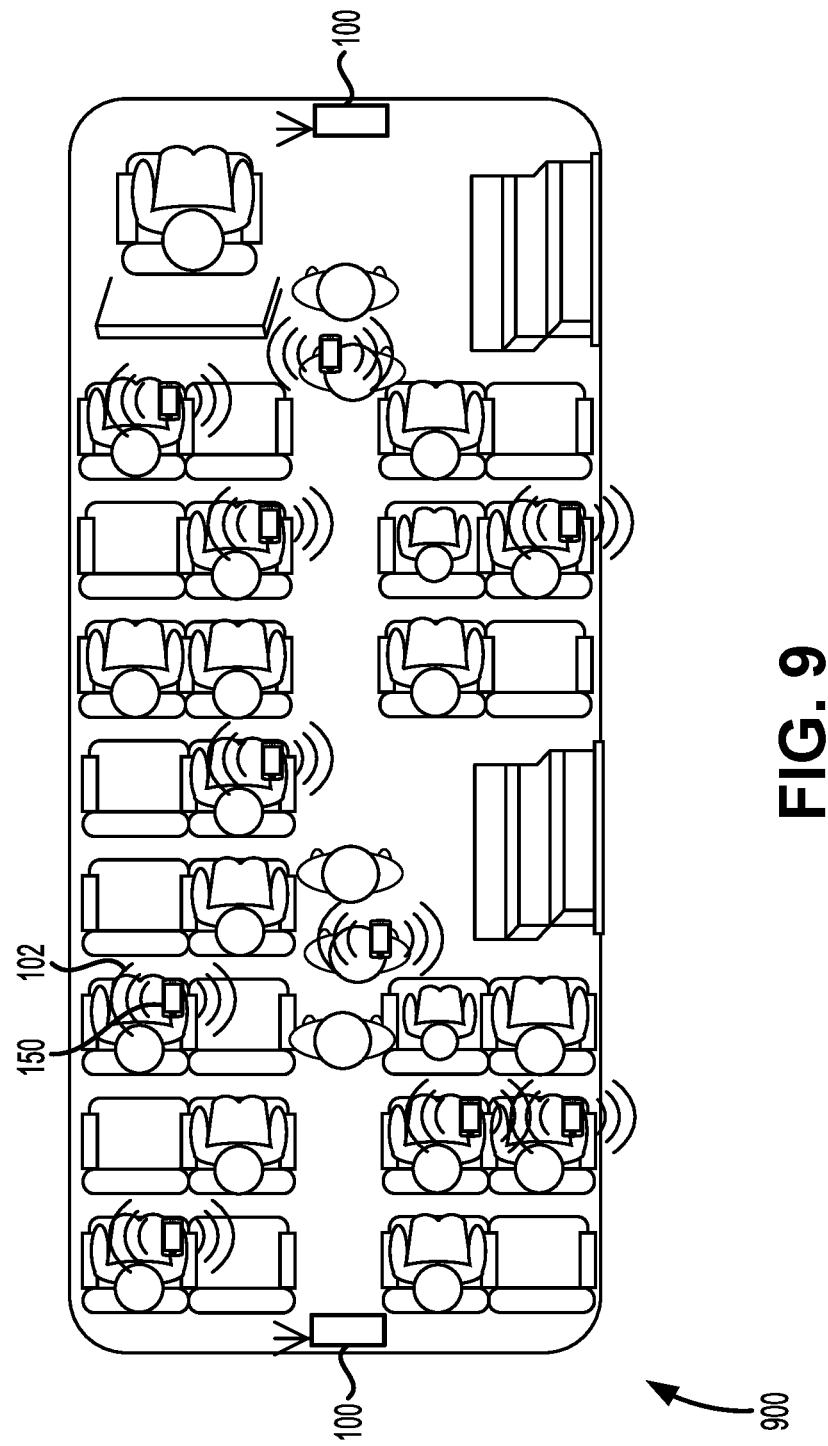
FIG. 9 illustrates a receiving device being implemented within a bus, according to some embodiments of the present invention.

FIG. 9 illustrates receiving device 100 being implemented within a bus 900, according to some embodiments of the present invention. In some embodiments, receiving device 100 is positioned at the front of bus 900, at the side of bus 900, in the middle of bus 900, and/or at the back of bus 900, among other possibilities. In the illustrated embodiment, two receiving devices 100 are positioned at the front and the back of bus 900. Each of receiving devices 100 receives wireless signals 102 transmitted by transmitting devices 150 being carried by passengers on the bus, and a loss coefficient n is calculated by one or both of receiving devices 100. In some embodiments, the two loss coefficients n calculated by receiving devices 100 are averaged. The total number of passengers on bus 900 may be estimated based on loss coefficient n by, for example, multiplying loss coefficient n by an area-specific constant c. Area-specific constant c may vary based on the size of bus 900, the width of bus 900, the length of bus 900, and/or the positioning of receiving device 100 within bus 900.

Figure 10:
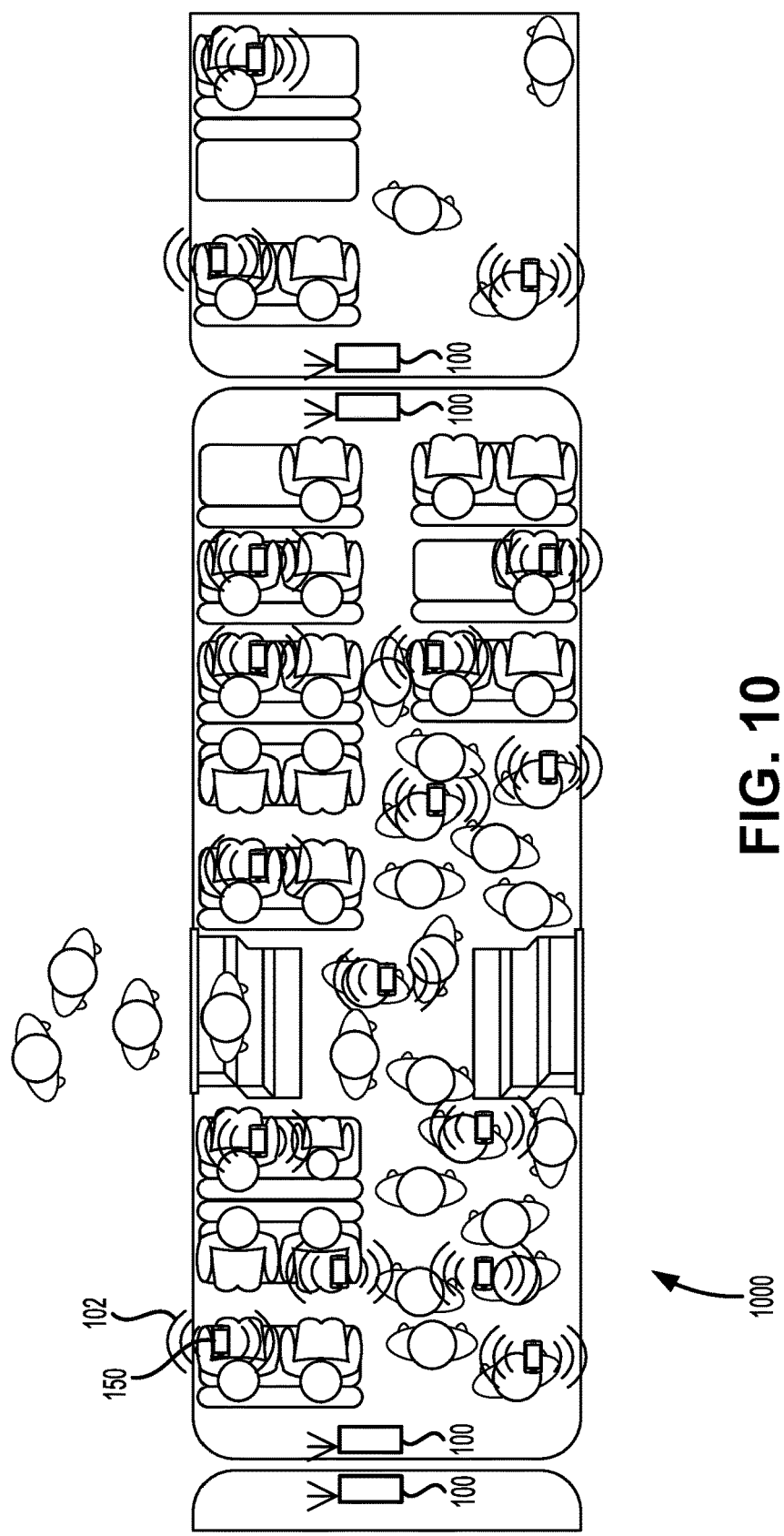
FIG. 10 illustrates a receiving device being implemented within a train passenger car, according to some embodiments of the present invention.

FIG. 10 illustrates receiving device 100 being implemented within a train passenger car 1000, according to some embodiments of the present invention. In some embodiments, receiving device 100 is positioned at the front of passenger car 1000, at the side of passenger car 1000, in the middle of passenger car 1000, and/or at the back of passenger car 1000, among other possibilities. In the illustrated embodiment, two receiving devices 100 are positioned at the front and the back of passenger car 1000. Each of receiving devices 100 receives wireless signals 102 transmitted by transmitting devices 150 being carried by passengers on passenger car 1000, and a loss coefficient n is calculated by one or both of receiving devices 100. In some embodiments, the two loss coefficients n calculated by receiving devices 100 are averaged. The total number of passengers on passenger car 1000 may be estimated based on loss coefficient n by, for example, multiplying loss coefficient n by area-specific constant c. Area-specific constant c may vary based on the size of passenger car 1000, the width of passenger car 1000, the length of passenger car 1000, and/or the positioning of receiving device 100 within passenger car 1000. Similar or identical passenger cars may have the same area-specific constant c, and therefore calibration of area-specific constant c need only be performed a single time and may be used for multiple passenger cars.

Figure 11:
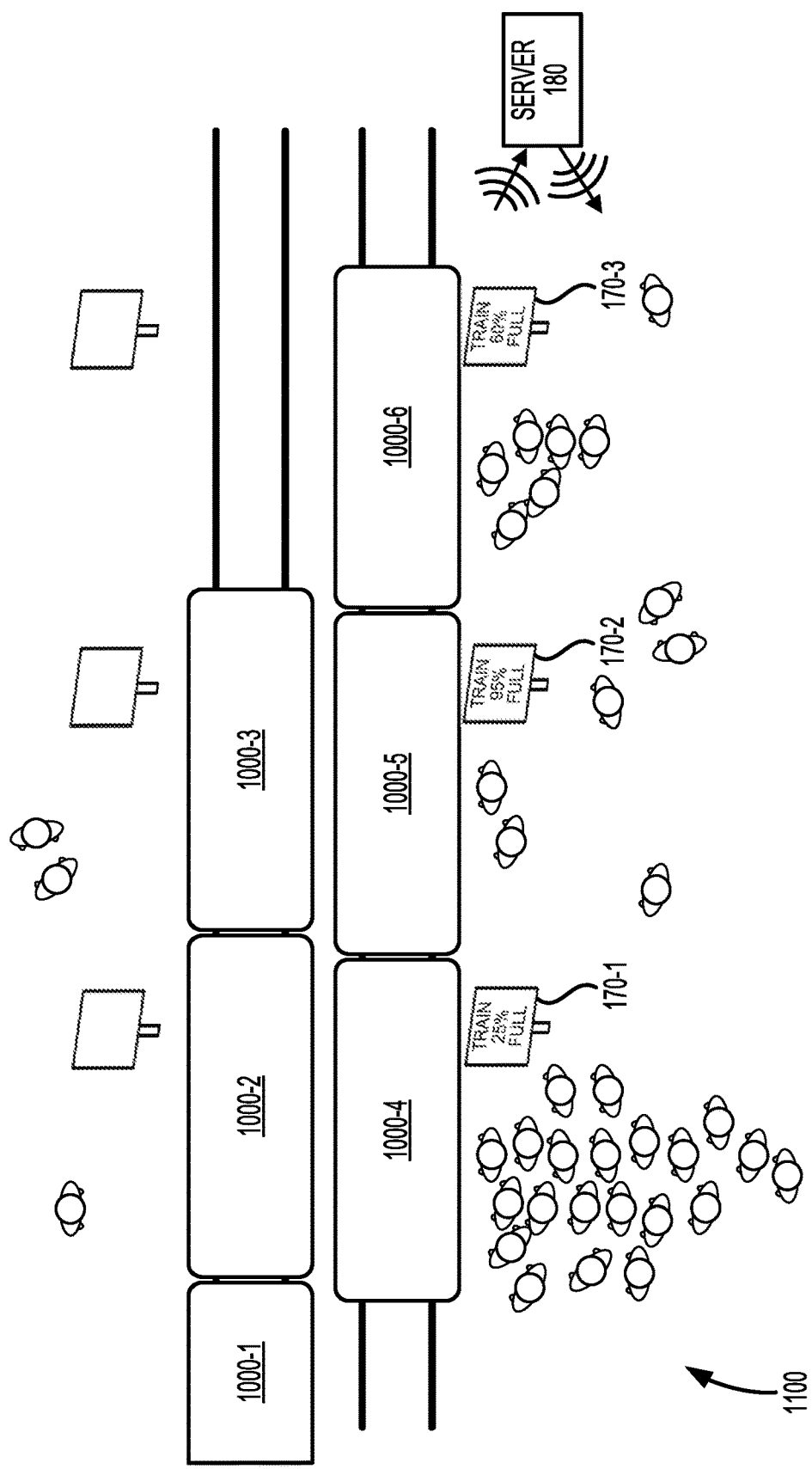
FIG. 11 illustrates a train station having multiple passenger cars passing therethrough, according to some embodiments of the present invention.

FIG. 11 illustrates a train station 1100 having multiple passenger cars 1000 passing therethrough, according to some embodiments of the present invention. In the illustrated embodiment, passenger cars 1000-1, 1000-2, 1000-3 are leaving station 1100 and passenger cars 1000-4, 1000-5, 1000-6 are arriving at station 1100. Receiving devices 100 within passenger cars 1000 may communicate with a server 180, such as a transit server, and may transmit data indicating the number of passengers on passenger cars 1000, loss coefficient n for passenger cars 1000, and/or power levels 132. Server 180 may be communicatively coupled to one or more displays 170 and may send messages regarding the number of passengers on passenger cars 1000 to be displayed on displays 170. For example, at some time prior to the train's arrival, server 180 may calculate the number of passengers on passenger cars 1000-4, 1000-5, 1000-6 (based on data received from receiving devices 100) and may send data to displays 170-1, 170-2, 170-3 to cause the occupancy of passenger cars 1000-4, 1000-5, 1000-6 to be displayed on displays 170-1, 170-2, 170-3, respectively. Passengers at station 1100 may view the displayed information and assembly themselves in different lines such that the number of passengers waiting to board a particular passenger car does not exceed the capacity of that passenger car.

Figure 12:
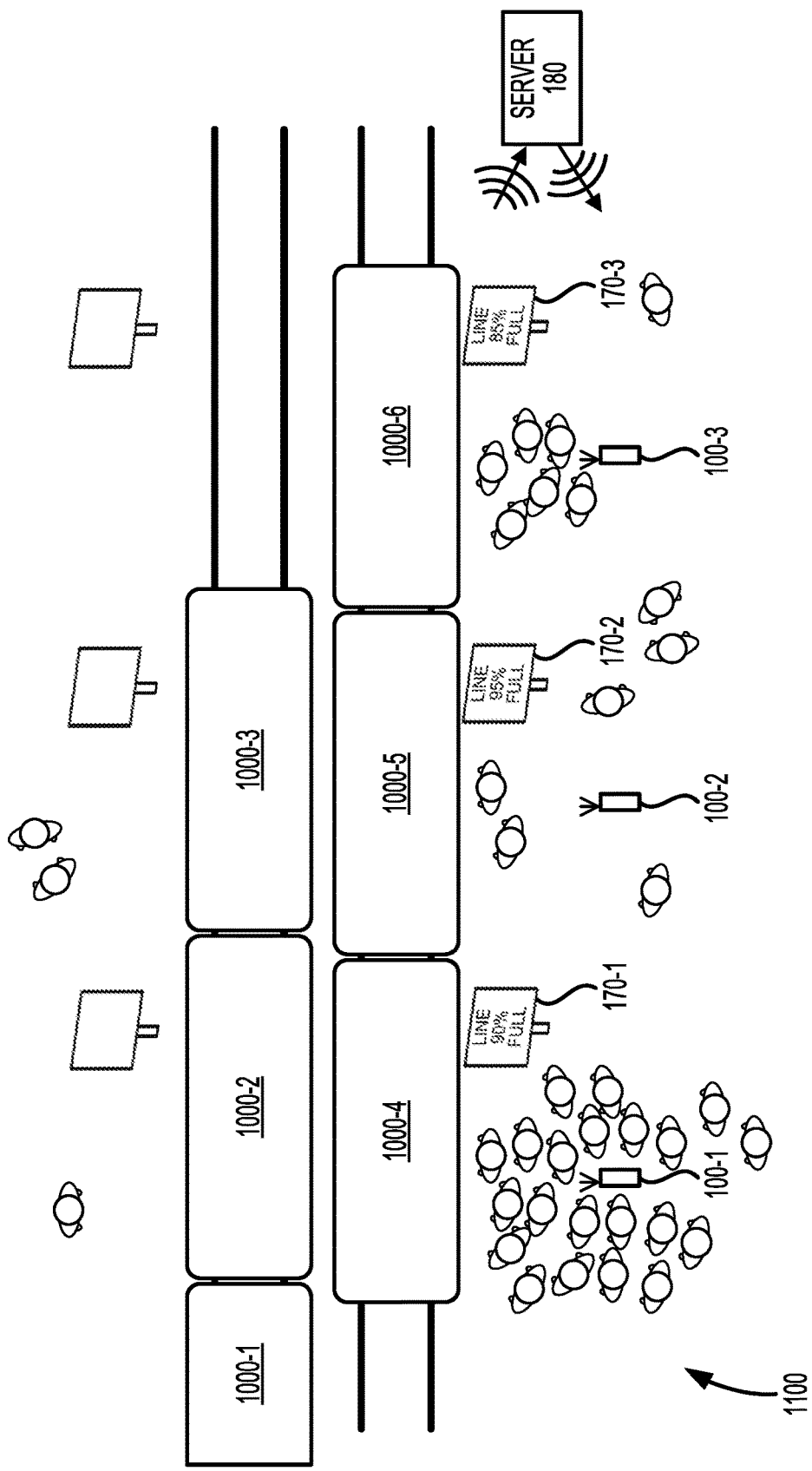
FIG. 12 illustrates a train station having multiple passenger cars passing therethrough, according to some embodiments of the present invention.

FIG. 12 illustrates a train station 1100 having multiple passenger cars 1000 passing therethrough, according to some embodiments of the present invention. In the illustrated embodiment, passenger cars 1000-1, 1000-2, 1000-3 are leaving station 1100 and passenger cars 1000-4, 1000-5, 1000-6 are arriving at station 1100. Receiving devices 100 within passenger cars 1000 may communicate with server 180 and may transmit data indicating the number of passengers on passenger cars 1000, loss coefficient n for passenger cars 1000, and/or power levels 132. Additionally, receiving devices 100-1, 100-2, 100-3 may be positioned near the boarding areas for passenger cars 1000-4, 1000-5, 1000-6, respectively, to estimate the number of boarding passengers in each boarding area. Receiving devices 100-1, 100-2, 100-3 may communicate with server 180 and may transmit data indicating the number of boarding passengers in the boarding areas, loss coefficient n for the boarding areas, and/or power levels 132.

Server 180 may calculate the number of passengers on passenger cars 1000-4, 1000-5, 1000-6 (based on data received from receiving devices 100) and the number of boarding passengers in the boarding areas (based on data received from receiving devices 100-1, 100-2, 100-3) and may compare the calculations to determine an occupancy level for each boarding area. For example, it may be determined that a passenger car has room for 20 additional passengers and that the corresponding boarding area currently has 18 passengers, and an occupancy level of 90% may be displayed on the corresponding display. At some time prior to the train's arrival, or at multiple times prior to the train's arrival (e.g., in real time), server 180 may communicate with displays 170-1, 170-2, 170-3 and may send messages regarding the occupancy level for the boarding areas for passenger cars 1000-4, 1000-5, 1000-6 to be displayed on displays 170-1, 170-2, 170-3, respectively. Passengers at station 1100 may view the displayed information and assembly themselves in different lines such that the number of passengers waiting in a particular boarding area does not exceed the capacity of that boarding area.

Figure 13:
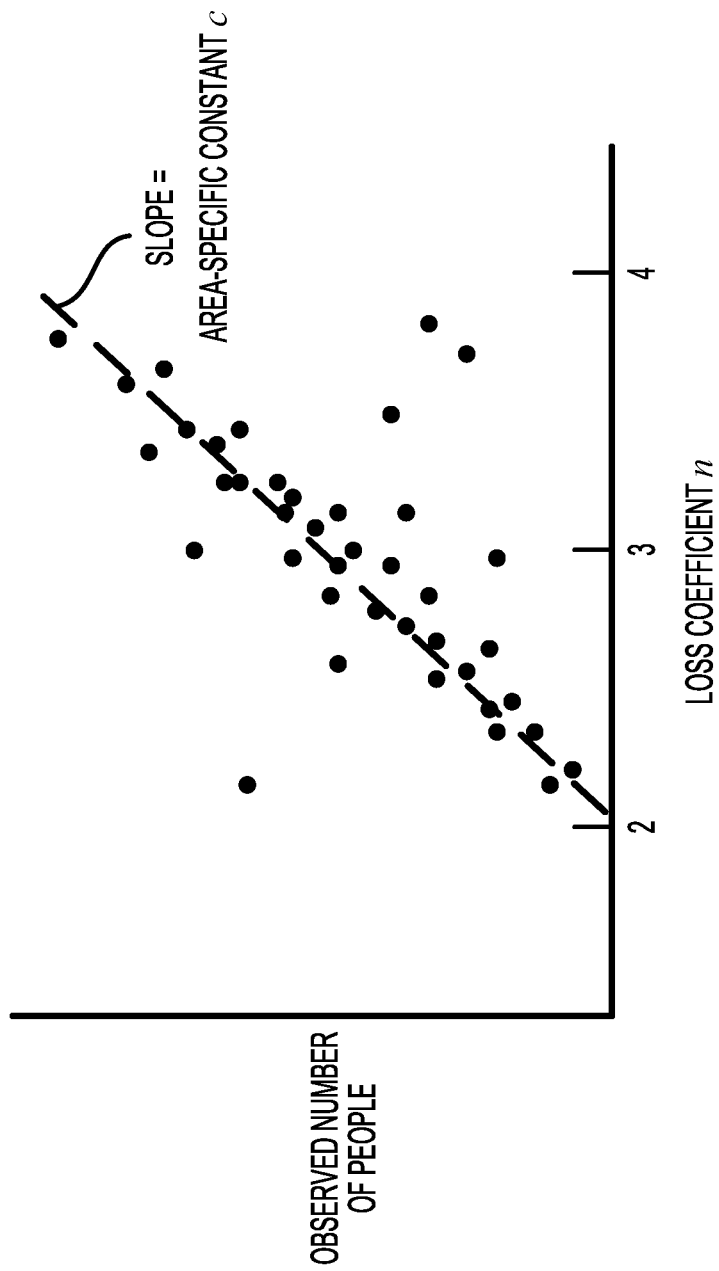
FIG. 13 illustrates a method of determining an area-specific constant, according to some embodiments of the present invention.

FIG. 13 illustrates a method of determining area-specific constant c, according to some embodiments of the present invention. In some embodiments, a plurality of data points are collected by observing the number of people surrounding receiving device 100 and recording the calculated loss coefficient n at or near the same time the observation was made. The observations may be made manually or using an automated approach (e.g., placing temporary cameras near receiving device 100 during the calibration phase). The data points may be plotted and an average slope may be calculated using a least squares method. The calculated slope may be used to determine the area-specific constant c. For example, area-specific constant c may be set equal to the calculated slope such that the number of people surrounding receiving device 100 may be estimated by multiplying a calculated loss coefficient n by the determined area-specific constant c.

Figure 14:
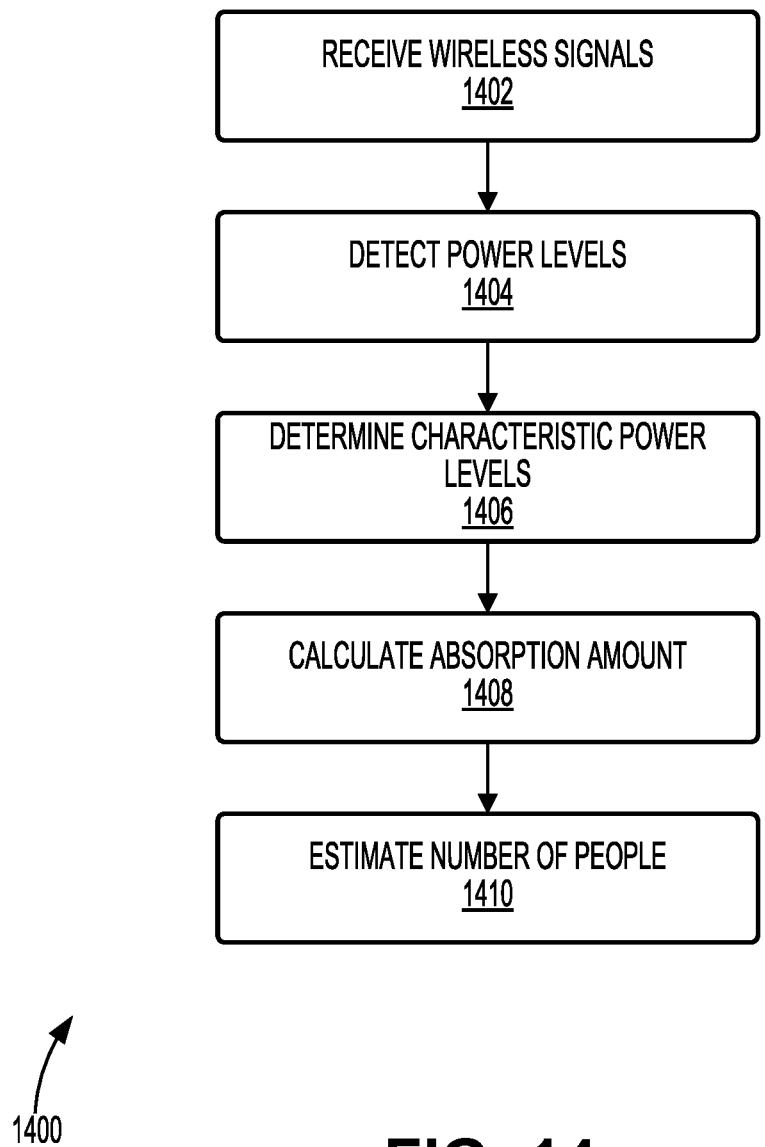
FIG. 14 illustrates a method of estimating a number of people surrounding a receiving device, according to some embodiments of the present invention.

FIG. 14 illustrates a method 1400 of estimating a number of people surrounding receiving device 100, according to some embodiments of the present invention. One or more steps of method 1400 may constitute a method of detecting wireless signal absorption (e.g., steps 1402-1410). Steps of method 1400 need not be performed in the order shown, and one or more steps of method 1400 may be omitted during performance of method 1400.

At step 1402, a plurality of wireless signals 102 are received by receiving device 100 from a plurality of transmitting devices 150.

At step 1404, a plurality of power levels 132 for the plurality of wireless signals 102 are detected by receiving device 100. Each of the plurality of power levels 132 may correspond to one of the plurality of wireless signals 102 (i.e., each is a power level of one of the signals), and more than one of the plurality of power levels 132 may correspond to the same wireless signal. For example, different power levels may be detected at different times for the same wireless signal. In some embodiments, the plurality of power levels 132 are detected by power sensing circuitry 110 of receiving device 100 and are sent to digital signal processor 120. Digital signal processor 120 may contain one or more processors and an associated memory, and may be configured to perform one or more operations based on the plurality of power levels 132 and area-specific constant c, which may be determined during a calibration phase performed prior to performance of method 1400.

At step 1406, the plurality of power levels 132 are analyzed to determine one or more characteristic power levels. In some embodiments, the plurality of power levels 132 are analyzed to determine three characteristic power levels. In some embodiments, step 1406 is performed by digital signal processor 120. In some embodiments, step 1406 is performed by remote processor 144.

At step 1408, an absorption amount is calculated based on the one or more characteristic power levels. The absorption amount may indicate an amount of wireless signal absorption of the plurality of wireless signals 102. The absorption amount may include loss coefficient n as described herein or some other metric of absorption. In some embodiments, step 1408 is performed by digital signal processor 120. In some embodiments, step 1408 is performed by remote processor 144.

At step 1410, a number of people surrounding (i.e., within a threshold distance of) receiving device 100 is estimated (i.e., calculated) based at least in part on the absorption amount. In some embodiments, loss coefficient n may be multiplied by area-specific constant c to calculate the number of people surrounding device 100. In other embodiments, loss coefficient n may be used as input to a lookup table to calculate the number of people. In some embodiments, step 1410 is performed by digital signal processor 120. In some embodiments, step 1410 is performed by remote processor 144.

The following description is a specific theoretical development of one possible implementation of the present invention. Some implementations of the present invention may deviate slightly or significantly from the example given below.

In some embodiments, loss coefficient n represents a measure that reflects how transparent the medium between transmitter and receiver is to the electromagnetic waves. A loss coefficient of 2 may represent a vacuum. Higher values represent increasingly difficult mediums for the signal to pass through. A value of 4 is yielded by a material that effectively blocks the transmission. Values below 2 can occur where the medium is actively supporting transmission, such as in the presence of waveguides. The observed power at a receiver is the emitted power minus the losses due to free space and absorption, $$P_o = 10 \log\left(10^{\frac{P}{10}} - 10^{\frac{10 n \log r - s}{10}}\right)$$

where $P_o$ is the power of the signal observed by the receiver, P is the power emitted by the transmitter, r is the distance between the transmitter and receiver, s is a constant that represents the sensitivity of the receiver, and n is the loss coefficient.

This formula can be rearranged to calculate the distance between the transmitter and receiver, r, in terms of the values of $P_o$, P, s, and n.

$$r = 10^{\frac{\log\left(10^{\frac{P}{10}} - 10^{\frac{P_o}{10}}\right) + \frac{s}{10}}{n}}$$

Assuming that the transmitters are evenly distributed, then the number of transmitters closer than r and therefore detected at this power or higher is proportional to the floor area in a circle of radius r from the receiver.

$$O = \pi r^2 d$$

Combining these two equations for r results in $$\sqrt{\frac{O}{\pi d}} = 10^{\frac{\log\left(10^{\frac{P}{10}} - 10^{\frac{P_o}{10}}\right) + \frac{s}{10}}{n}}$$

where two different observed powers are defined as $P_o^a$ and $P_o^b$. They each have their own count of transmitters being received at higher signal strength $O^a$ and $O^b$ The relationship between the observed powers and count will follow the equation given above, $$\sqrt{\frac{O^a}{\pi d}} = 10^{\frac{\log\left(10^{\frac{P}{10}} - 10^{\frac{P_o^a}{10}}\right) + \frac{s}{10}}{n}}$$

and $$\sqrt{\frac{O^b}{\pi d}} = 10^{\frac{\log\left(10^{\frac{P}{10}} - 10^{\frac{P_o^b}{10}}\right) + \frac{s}{10}}{n}}$$

As the observed counts can be defined to be any figure, $O^b$ is defined as $O^b = 2 O^a$. Therefore $$\sqrt{2}\sqrt{\frac{O^a}{\pi d}} = \sqrt{\frac{O^b}{\pi d}} = 10^{\frac{\log\left(10^{\frac{P}{10}} - 10^{\frac{P_o^b}{10}}\right) + \frac{s}{10}}{n}}$$

$$\sqrt{\frac{O^a}{\pi d}} = \frac{10^{\frac{\log\left(10^{\frac{P}{10}} - 10^{\frac{P_o^b}{10}}\right) + \frac{s}{10}}{n}}}{\sqrt{2}}$$

Combining the two equations above for $$\sqrt{\frac{O^a}{\pi d}}$$

gives $$10^{\frac{\log\left(10^{\frac{P}{10}}-10^{\frac{P_o^a}{10}}\right)+\frac{s}{10}}{n}} = \frac{10^{\frac{\log\left(10^{\frac{P}{10}}-10^{\frac{P_o^b}{10}}\right)+\frac{s}{10}}{n}}}{\sqrt{2}}$$

and rearranging for n gives $$n = \frac{\log\left(\frac{10^{\frac{P}{10}} - 10^{\frac{P_o^b}{10}}}{10^{\frac{P}{10}} - 10^{\frac{P_o^a}{10}}}\right)}{\log\sqrt{2}}$$

where n is the loss coefficient, P is the power of the transmitters, $P_o^a$ is the observed power such that X signals have a higher strength than $P_o^a$ and $P_o^b$ is the observed power such that 2x signals have a higher strength than $P_o^b$.

To maximize sensitivity, X should be ⅓ of the signals received at the receiver. Assuming that the transmitters are similar, the strongest signal will be closest to the transmitted power. Thus, when there are many evenly distributed transmitters, the loss coefficient of the transmitting medium can be calculated using the formula:

$$n = \frac{\log\left(\frac{10^{\frac{P}{10}} - 10^{\frac{P_o^b}{10}}}{10^{\frac{P}{10}} - 10^{\frac{P_o^a}{10}}}\right)}{\log\sqrt{2}}$$

where n is the loss coefficient, P is the power of the strongest signal received (i.e., first characteristic power level $P_1$), $P_o^a$ is the observed power such that ⅓ of the signals have a higher strength than $P_o^a$ (i.e., second characteristic power level $P_2$), and $P_o^b$ is the observed power such that ⅔ of the signals have a higher strength than $P_o^b$ (i.e., third characteristic power level $P_3$).

In some embodiments with many transmitting devices, the values calculated by the formula should range between 2 and 4, where 2 is indicative of transmission through a vacuum and 4 of a medium that blocks signals. If the calculated values are significantly outside the physically plausible values of 2 to 4, then the data may be erroneous, although it can be expected to get occasional instances of values below 2 due to reflections.

Figure 15:
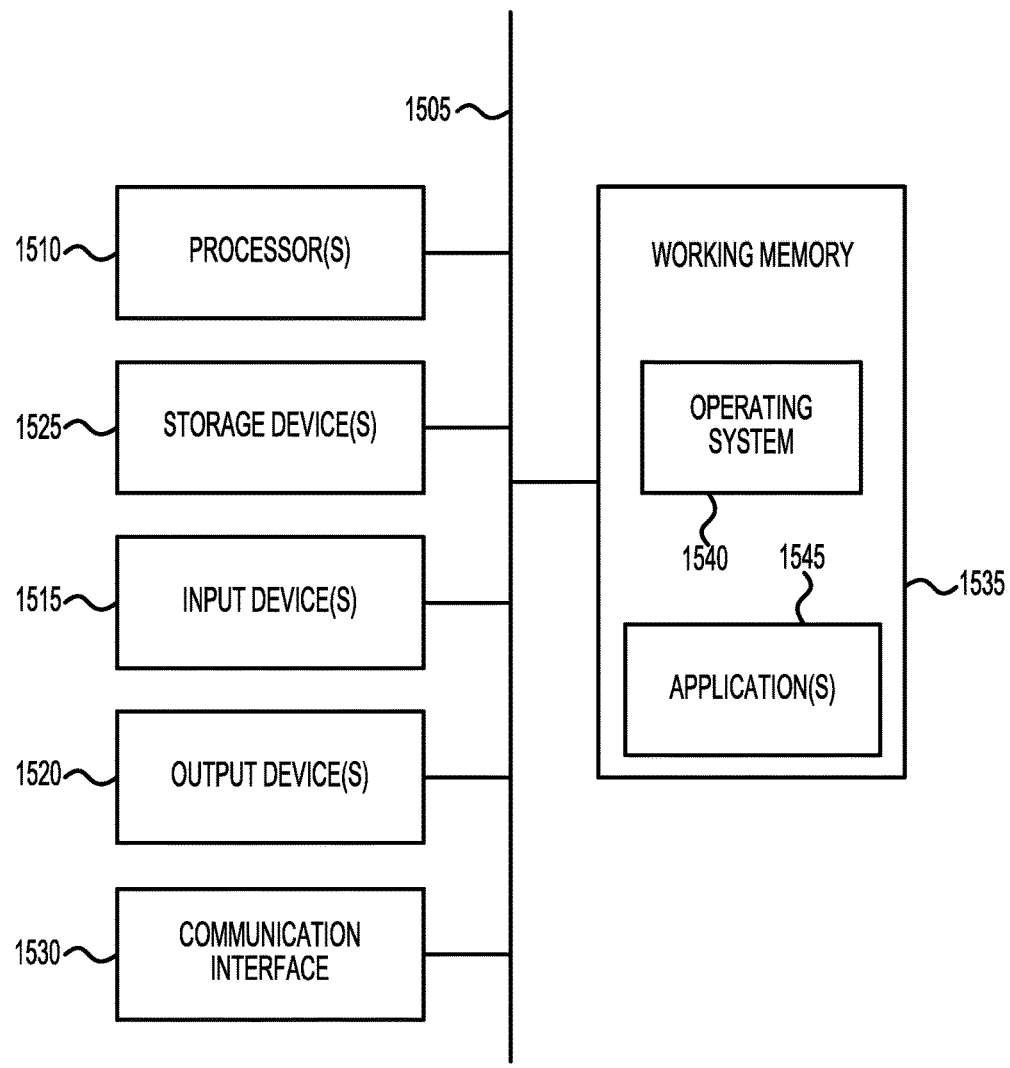
FIG. 15 illustrates a simplified computer system, according to some embodiments of the present invention.

FIG. 15 illustrates a simplified computer system 1500, according to some embodiments of the present invention. Computer system 1500 may be incorporated as part of the previously described computerized devices. FIG. 15 provides a schematic illustration of one embodiment of a computer system 1500 that can perform the methods provided by various other embodiments, as described herein. FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computer system 1500 is shown comprising hardware elements that can be electrically coupled via a bus 1505 (or may otherwise be in communication, as appropriate). The hardware elements may include a processing unit 1510, including without limitation one or more general-purpose processors and/or one or more special-purpose processors (such as digital signal processing chips, graphics acceleration processors, and/or the like); one or more input devices 1515, which can include without limitation a keyboard, a touchscreen, receiver, a motion sensor, a camera, a smartcard reader, a contactless media reader, and/or the like; and one or more output devices 1520, which can include without limitation a display device, a speaker, a printer, a writing module, and/or the like.

The computer system 1500 may further include (and/or be in communication with) one or more non-transitory storage devices 1525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1500 might also include a communication interface 1530, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1530 may permit data to be exchanged with a network (such as the network described below, to name one example), other computer systems, and/or any other devices described herein. In many embodiments, the computer system 1500 will further comprise a non-transitory working memory 1535, which can include a RAM or ROM device, as described above.

The computer system 1500 also can comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1510, applications 1545, etc.) Further, connection to other computing devices such as network input/output devices may be employed.

Some embodiments may employ a computer system (such as the computer system 1500) to perform methods in accordance with the disclosure. For example, some or all of the procedures of the described methods may be performed by the computer system 1500 in response to processing unit 1510 executing one or more sequences of one or more instructions (which might be incorporated into the operating system 1540 and/or other code, such as an application program 1545) contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processing unit 1510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processing unit 1510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1525. Volatile media include, without limitation, dynamic memory, such as the working memory 1535. Transmission media include, without limitation, coaxial cables, copper wire and fiber optics, including the wires that comprise the bus 1505, as well as the various components of the communication interface 1530 (and/or the media by which the communication interface 1530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1530 (and/or components thereof) generally will receive the signals, and the bus 1505 then might carry the signals (and/or the data, instructions, etc. carried by the signals) to the working memory 1535, from which the processor(s) 1505 retrieves and executes the instructions. The instructions received by the working memory 1535 may optionally be stored on a non-transitory storage device 1525 either before or after execution by the processing unit 1510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of estimating crowd size based on detected wireless signal absorption, the method comprising:
   receiving, by a receiving device, a plurality of wireless signals from a plurality of transmitting devices;
   detecting a plurality of power levels for the plurality of wireless signals, wherein each power level of the plurality of power levels corresponds to one of the plurality of wireless signals;
   analyzing, by one or more processors, the plurality of power levels to determine three characteristic power levels of the plurality of power levels;
   calculating, by the one or more processors, an absorption amount based on the three characteristic power levels; and
   estimating, by the one or more processors, a number of people based at least in part on the absorption amount.

2. The method of claim 1, wherein a first characteristic power level of the three characteristic power levels is a maximum power level of the plurality of power levels.

3. The method of claim 2, wherein:
   a second characteristic power level of the three characteristic power levels is a $2/3$ percentile power level of the plurality of power levels; and
   a third characteristic power level of the three characteristic power levels is a $1/3$ percentile power level of the plurality of power levels.

4. The method of claim 3, wherein calculating the absorption amount based on the three characteristic power levels includes:
   calculating a first difference between the first characteristic power level and the third characteristic power level;

calculating a second difference between the first characteristic power level and the second characteristic power level; and calculating a ratio between the first difference and the second difference, wherein the absorption amount is calculated based on the ratio.

5. The method of claim 1, wherein the one or more processors are located within the receiving device.

6. The method of claim 1, wherein the one or more processors are located remote to the receiving device.

7. A receiving device for estimating crowd size based on detected wireless signal absorption, the receiving device comprising:
an antenna for receiving a plurality of wireless signals from a plurality of transmitting devices;
power sensing circuitry for detecting a plurality of power levels for the plurality of wireless signals, wherein each power level of the plurality of power levels corresponds to one of the plurality of wireless signals; and
one or more processors configured to perform operations including:
analyzing the plurality of power levels to determine three characteristic power levels of the plurality of power levels;
calculating an absorption amount based on the three characteristic power levels; and
estimating a number of people based at least in part on the absorption amount.

8. The receiving device of claim 7, wherein a first characteristic power level of the three characteristic power levels is a maximum power level of the plurality of power levels.

9. The receiving device of claim 8, wherein:
a second characteristic power level of the three characteristic power levels is a ⅔ percentile power level of the plurality of power levels; and
a third characteristic power level of the three characteristic power levels is a ⅓ percentile power level of the plurality of power levels.

10. The receiving device of claim 9, wherein calculating the absorption amount based on the three characteristic power levels includes:
calculating a first difference between the first characteristic power level and the third characteristic power level;
calculating a second difference between the first characteristic power level and the second characteristic power level; and
calculating a ratio between the first difference and the second difference, wherein the absorption amount is calculated based on the ratio.

11. The receiving device of claim 7, wherein the plurality of power levels are received from the power sensing circuitry via a wireless connection.

12. A non-transitory computer-readable medium comprising instructions that, when executed by one or more processors, cause the one or more processors to perform operations including:
receiving a plurality of wireless signals from a plurality of transmitting devices;
detecting a plurality of power levels for the plurality of wireless signals, wherein each power level of the plurality of power levels corresponds to one of the plurality of wireless signals;
analyzing the plurality of power levels to determine three characteristic power levels of the plurality of power levels;
calculating an absorption amount based on the three characteristic power levels; and
estimating a number of people based at least in part on the absorption amount.

13. The non-transitory computer-readable medium of claim 12, wherein a first characteristic power level of the three characteristic power levels is a maximum power level of the plurality of power levels.

14. The non-transitory computer-readable medium of claim 13, wherein:
a second characteristic power level of the three characteristic power levels is a ⅔ percentile power level of the plurality of power levels; and
a third characteristic power level of the three characteristic power levels is a ⅓ percentile power level of the plurality of power levels.

15. The non-transitory computer-readable medium of claim 14, wherein calculating the absorption amount based on the three characteristic power levels includes:
calculating a first difference between the first characteristic power level and the third characteristic power level;
calculating a second difference between the first characteristic power level and the second characteristic power level; and
calculating a ratio between the first difference and the second difference, wherein the absorption amount is calculated based on the ratio.

16. The non-transitory computer-readable medium of claim 12, wherein the one or more processors are located within a receiving device.

17. The non-transitory computer-readable medium of claim 12, wherein the one or more processors are located remote to a receiving device.

* * * * *